United States Patent [19]

Miyata

[11] Patent Number: 5,485,205
[45] Date of Patent: Jan. 16, 1996

[54] SMEAR COMPENSATION CIRCUIT FOR A SOLID STATE IMAGER

[75] Inventor: Katsurou Miyata, Kanagawa, Japan

[73] Assignee: Sony Corporation, Tokyo, Japan

[21] Appl. No.: 250,949

[22] Filed: May 31, 1994

Related U.S. Application Data

[63] Continuation of Ser. No. 901,182, Jun. 19, 1992, abandoned.

[30] Foreign Application Priority Data

Jun. 21, 1991 [JP] Japan .................................. 3-177175

[51] Int. Cl.⁶ .................................................. H04N 5/335
[52] U.S. Cl. ........................................... 348/248; 348/249
[58] Field of Search ................................... 348/229, 241, 348/248, 249, 255, 251, 714, 715, 718; 358/404, 426, 428, 444; 341/60, 87, 95; 382/232, 233, 234; H04N 5/335

[56] References Cited

U.S. PATENT DOCUMENTS

| 4,010,319 | 3/1977 | Levine | 358/213 |
|---|---|---|---|
| 4,516,172 | 5/1985 | Miyata et al. | 358/228 |
| 4,547,807 | 10/1985 | Mitani et al. | 358/213 |
| 4,558,366 | 12/1985 | Nagumo | 358/213 |
| 4,581,651 | 4/1986 | Miyata et al. | 358/213 |
| 4,608,608 | 8/1986 | Nishizawa et al. | 358/213 |
| 4,742,396 | 5/1988 | Bell | 358/213.24 |
| 4,851,904 | 7/1989 | Miyazaki et al. | 358/105 |
| 4,875,098 | 10/1989 | Shimizu et al. | 341/156 |
| 4,992,873 | 2/1991 | Koslov et al. | 358/167 |
| 5,005,082 | 4/1991 | Zdepski et al. | 358/174 |
| 5,016,107 | 5/1991 | Sasson et al. | 358/906 |
| 5,046,179 | 9/1991 | Uomori | 364/728.03 |
| 5,089,894 | 2/1992 | Higashitsutsumi | 358/213.24 |
| 5,321,522 | 6/1994 | Eschbach | 348/384 |

FOREIGN PATENT DOCUMENTS

| 57-133776 | 8/1982 | Japan | H04N 5/30 |
|---|---|---|---|
| 58-27472 | 2/1983 | Japan | H04N 5/30 |
| 58-027472 | 2/1983 | Japan | H04N 5/30 |
| 58-156272 | 9/1983 | Japan | H04N 5/21 |
| 58-195372 | 11/1983 | Japan | H04N 5/30 |
| 59-000275 | 1/1984 | Japan | H04N 5/21 |
| 59-211385 | 11/1984 | Japan | H04N 5/30 |
| 211385 | 11/1984 | Japan | H04N 5/30 |
| 63-3173474 | 7/1988 | Japan | H04N 5/30 |

OTHER PUBLICATIONS

Japanese Patent Abstracts of Japan, vol. 8, No. 3, Mar. 9, 1984, JP-A-58204679.
Japanese Patent Abstracts of Japan, vol. 9, No. 81, 10 Apr. 1985, JP-A-59 211 385.
JP 58-204679(A), Nov. 29, 1983, Sakuraba.
JP 58-219873(A), Dec. 21, 1983, Kobayashi.
JP 60-4378(A), Jan. 10, 1985, Suga.
JP 60-217764(A), Oct. 31, 1985, Watanabe.

*Primary Examiner*—Joseph Mancuso
*Assistant Examiner*—Bipin Shalwala
*Attorney, Agent, or Firm*—Hill, Steadman & Simpson

[57] ABSTRACT

The present invention is to provide a smear compensation circuit in which the memory capacity of a memory can be reduced without deteriorating the quality of a reproduced image based on an output of a solid state image pickup device.

A peak value of the video signal in the vertical blanking period is detected by a peak detecting circuit (10) and a gain of smear data written in a 1H memory (8) is adjusted by (xA) in response to the detected peak value, whereby the smear data is stored in the memory having a restricted memory capacity. Further, when the data is read out from the 1H memory (8), the gain of the read-out data is adjusted in an opposite manner (x1/A) to thereby obtain a smear component of the original level. Then, this smear component is subtracted from the video signal.

4 Claims, 5 Drawing Sheets

SMEAR COMPENSATION CIRCUIT FOR A SOLID STATE IMAGER

This is a continuation of application Ser. No. 07/901,182, filed Jun. 19, 1992, now abandoned.

BACKGROUND OF THE INVENTION

1. Field of the Invention

The present invention generally relates to smear compensation circuits for eliminating a smear component which is contained in and peculiar to an output of a solid state imager and, more particularly, to a smear compensation circuit for compensating for a smear of an output from camera apparatus such as a video camera using a solid state image pickup device or the like.

2. Description of the Prior Art

The occurrence of a color aliasing signal known as a smear is enumerated as one of phenomena peculiar to solid state image pickup devices. The smear component occurs when a light is directly introduced into a vertical transfer section or when charges produced within a semiconductor substrate are expanded by the diffusion and mixed into the vertical transfer section. The smear component tends to occur particularly when the cameraman takes a picture of an object having high brightness, which causes the quality of a reproduced image to be deteriorated.

As conventional smear compensation circuits for compensating for the smear component inherent in the solid state image pickup devices, there is known a smear compensation circuit in which a smear component in the vertical blanking period is written in a memory and a smear component read out from the memory during the video period is subtracted from a video signal to thereby compensate for the smear component because only the smear component exists during the vertical blanking period and the smear component is superposed on the video signal during the video period. Japanese Laid-Open Patent Publication No. 63-173474, for example, describes this conventional smear compensation circuit.

However, the conventional smear compensation circuit, which uses a memory of a limited bit capacity in order to reduce the capacity of the memory, could not fulfil both a quantization noise (data length per bit) and a dynamic range (maximum compensation range). That is, if the former is satisfied, then a compensation signal is clipped when there are too much smear component and the smear components cannot be fully compensated for. If the latter is satisfied, then a vertical distortion appears due to a quantization noise, which causes the quality of image to be deteriorated.

This disadvantage encountered with the prior art will be described with reference to FIG. 1 in which a block input is 8 bits and a memory capacity is 6 bits.

When higher-order 2 bits are neglected as shown at (a) in FIG. 1, then a so-called round-off noise does not occur but the smear component of 2 bits is not compensated. Further, when lower-order 2 bits are neglected at (b) in FIG. 1, then the smear component is fully compensated but the round-off noise occurs. That is, in the above two cases, since 8 bits are stored in the memory having the capacity of 6 bits, the round-off noise can neither be removed nor the smear component can be fully compensated for.

OBJECTS AND SUMMARY OF THE INVENTION

Therefore, it is an object of the present invention to provide an improved smear compensation circuit for a solid state imager in which the aforesaid shortcomings and disadvantages of the prior art can be eliminated.

It is an object of the present invention to provide a smear compensation circuit in which a memory capacity can be reduced without deteriorating the image quality of a reproduced picture based on an output from a solid state imager.

As an aspect of the present invention, a smear compensation circuit for a solid state imager is comprised of an analog-to-digital converter for converting an analog video signal supplied thereto from an output of a solid state imager into a digital video signal, a peak detecting circuit coupled to an output of the analog-to-digital converter for detecting a peak value of the digital video signal in a vertical blanking period, a memory for storing therein write data in which the level of the digital video signal is adjusted by a first level adjusting circuit coupled to the output of the analog-to-digital converter on the basis of an output from the peak detecting circuit, a second level adjusting circuit for adjusting a level of read-out data read out from the memory, and a subtracting circuit for subtracting from the digital video signal a value in which the level of the read-out data read out from the memory is level-adjusted by the second level adjusting circuit during a video period of the digital video signal.

In the smear compensation circuit according to the present invention, a peak value of the digital video signal in the vertical blanking period is detected and a gain of smear data written in a memory is adjusted in response to the detected peak value, whereby the data is stored in the memory having a restricted memory capacity. Further, when the data is read out from the memory, the gain of the read-out data is adjusted in an opposite manner to thereby obtain a smear component of the original level. Then, this smear component is subtracted from the video signal to thereby obtain a video signal whose smear component is eliminated. Consequently, the memory capacity can be reduced without deteriorating the quality of a reproduced image based on an output of a solid state image pickup device.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described in detail with reference to the drawings.

Figure 1:
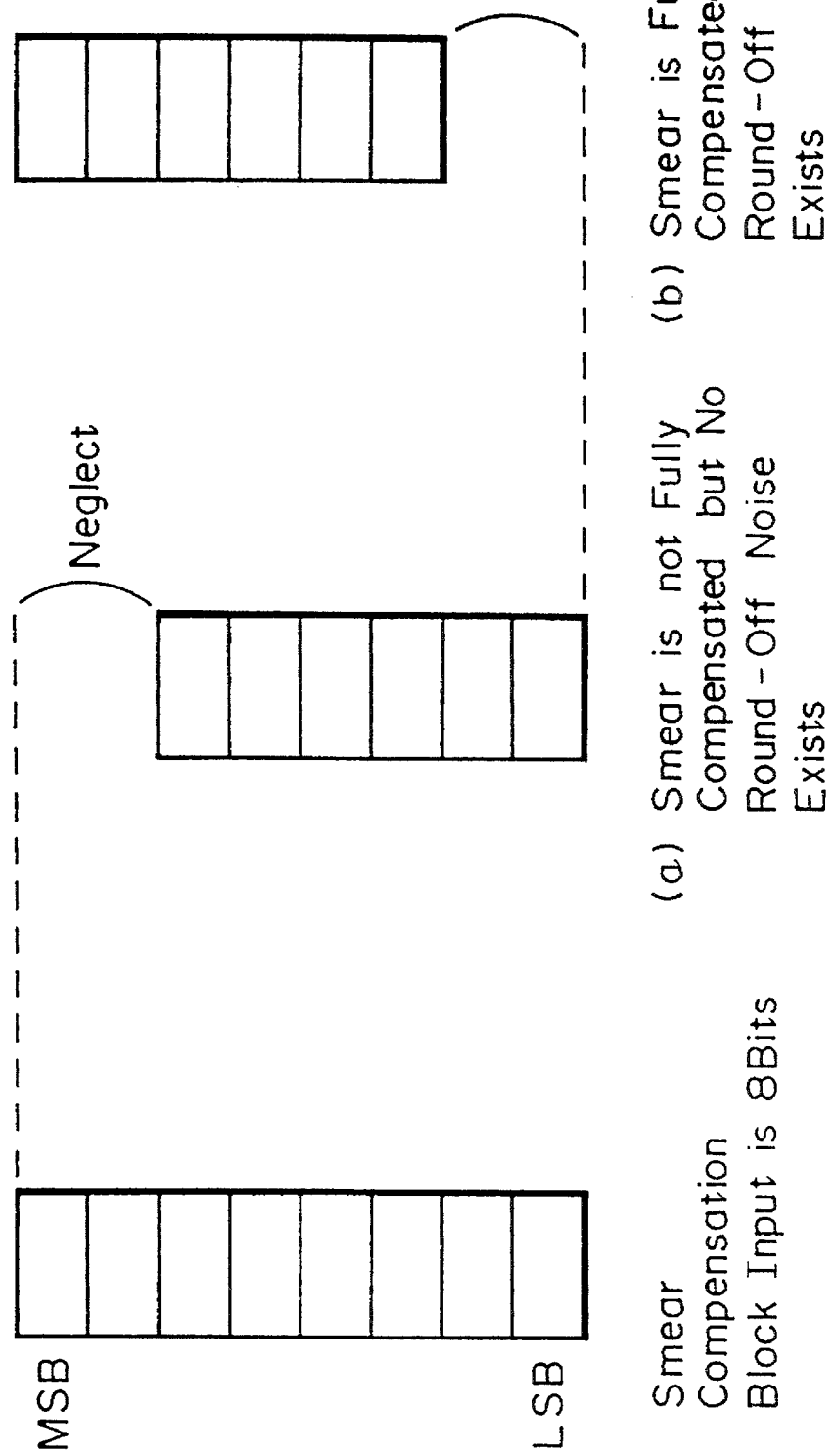
FIG. 1 is a diagram used to explain operation of an example of a smear compensation circuit according to the prior art.
Figure 2:
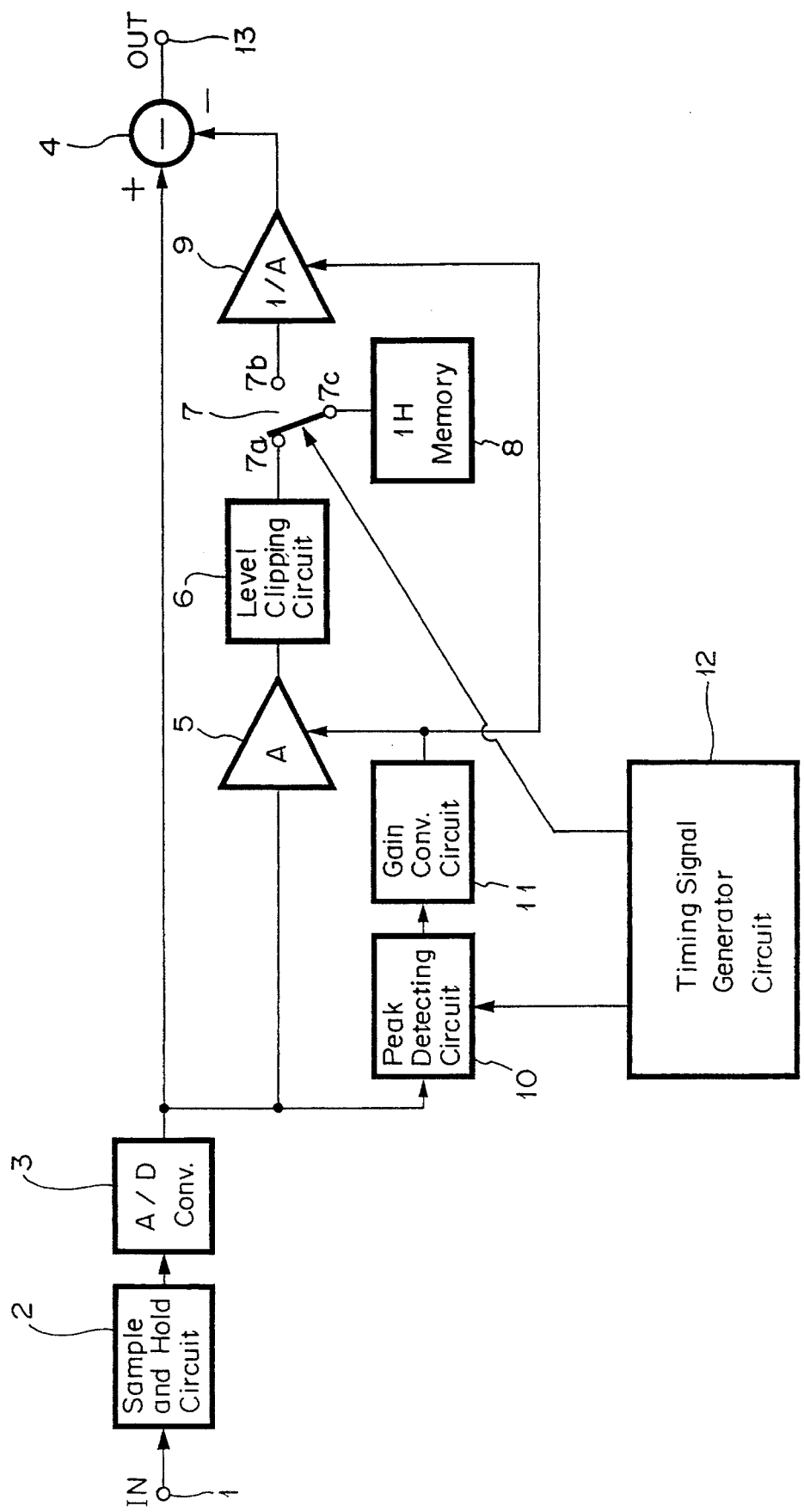
FIG. 2 is a block diagram showing a smear compensation circuit for a solid state imager according to a first embodiment of the present invention.

FIG. 2 of the accompanying drawings shows in block form a smear compensation circuit according to a first embodiment of the present invention.

Referring to FIG. 2, an imager output from a solid state imager device, e.g., CCD (charge coupled device) image sensor (not shown) is supplied to an input terminal 1. A video signal of this imager output is sampled by a sample and hold circuit 2 and then converted into a digital video signal by an analog-to-digital (A/D) converter 3.

The digital video signal from the A/D converter 3 is supplied to a subtracting circuit 4 as a subtracted input and also supplied through a gain adjusting circuit 5 and a level clipping circuit 6 to a first fixed contact 7a of a change-over circuit 7. A 1H (H represents a horizontal scanning period) memory 8 is coupled to a movable contact 7c of the change-over switch 7 so that, when the change-over switch 7 connects the movable contact 7c to the first fixed contact 7a, smear data is written in the 1H memory 8. Also, when the change-over switch 7 connects the movable contact 7c to a second fixed contact 7b, smear data is read out from the 1H memory 8.

The smear data read out from the 1H memory 8 is supplied through a gain adjusting circuit 9 to the subtracting circuit 4 as a subtracting input. The gain adjusting circuits 5 and 9 are adapted to adjust gains of the data written in the 1H memory 8 and the data read out from the 1H memory 8 in a complementary fashion. That is, assuming that A is the gain of the gain adjusting circuit 5, then the gain of the gain adjusting circuit 9 becomes 1/A.

The digital video signal is also supplied to a peak detecting circuit 10. The peak detecting circuit 10 is adapted to detect a peak value of a smear component existing in a vertical blanking period VBLK. A peak value information from the peak detecting circuit 10 is supplied to a gain converting circuit 11. The gain converting circuit 11 operates to set the gains A and 1/A of the gain adjusting circuits 5 and 9 on the basis of the peak value of the smear component.

A timing at which the peak detecting circuit 10 detects the peak value is determined by a timing signal generated from a timing generator circuit 12. A duration of this detection timing must be set to 1H period of at least 3H before the vertical blanking period VBLK of the video signal is ended because an extra period of 2H is needed in order to write data of 1H period in the 1H memory 8 and to read out the data of 1H period from the 1H memory 8 as shown in a timing chart forming FIG. 2.

The change-over switch 7 is changed-over in response to a switching control signal generated from the timing generator circuit 12. As will be clear from the timing chart forming FIG. 3, the writing of data in the 1H memory 8 is started from a timing of 2 H before the end of the vertical blanking period VBLK, which requires the change-over switch 7 to connect the movable contact 7c to the first fixed contact 7a at least on or before such timing point. Further, the change-over switch 7 connects the movable contact 7c to the second fixed contact 7b before 1H of the end of the vertical blanking period VBLK, whereby the smear data is read out from the 1H memory 8 until the start of the video period.

Figure 3:
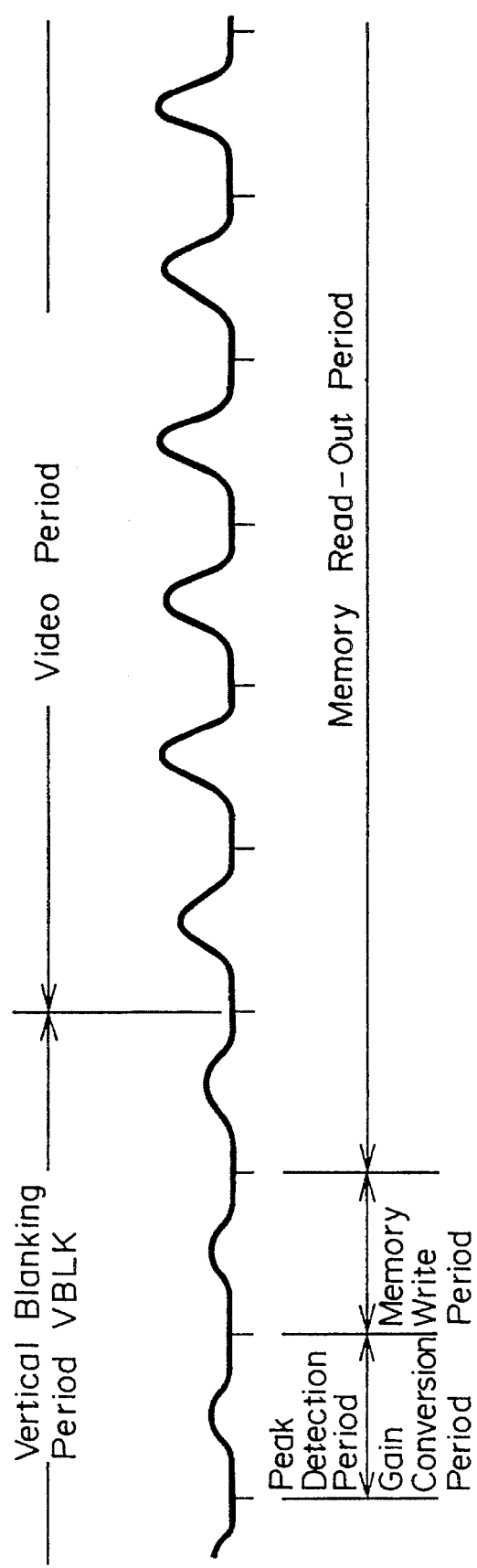
FIG. 3 is a timing chart used to explain operation of the smear compensation circuit according to the first embodiment of the present invention.

Operation of the smear compensation circuit thus arranged will be described with reference to the timing chart forming FIG. 3.

Initially, in the vertical blanking period VBLK of the video signal, the peak value of the smear component is detected during 1H period of 3H before the end of the vertical blanking period VBLK. Since it is to be noted that the smear component can constantly present a substantially constant peak value, the peak value of the smear component can be detected as substantially the same value during any period of the vertical blanking period.

The gain converting circuit 11 sets the gain A of the gain adjusting circuit 5 on the basis of the peal value of this smear component. The smear data whose gain is adjusted by the gain A is clipped by the clipping circuit 6 and then written in the 1H memory 8. The level clipping circuit 6 is provided in order to eliminate a noise component which causes the 1H memory 8 to overflow in memory capacity because there is the possibility that the level of the smear component will change during the peak detection period and during the memory writing period due to a random noise although the smear component in the vertical blanking period is the same in level inherently.

During the period 1H before the end of the vertical blanking period VBLK, the change-over switch 7 connects the movable contact 7c to the second fixed contact 7b to allow the smear data to be read out from the 1H memory 8. Then, the smear data thus read out is gain-adjusted in a complementary fashion by the gain 1/A which is the reciprocal number of the gain A in the writing and thereby is returned to the gain provided when the peak value is detected, whereafter it is subtracted from the video signal on which the smear component is superimposed. As a consequence, only a video signal whose smear component is eliminated can be delivered from an output terminal 13 led out from the subtracting circuit 4.

As described above, according to the present invention, the peak value of the smear component to be stored in the 1H memory is detected, and the smear component is gain-adjusted so as to fall within the dynamic range of the 1H memory 8 in response to the detected peak value. The thus gain-adjusted smear component is written in the 1H memory 8 and read out from the 1H memory 8. Then, the thus read-out smear component is gain-adjusted in a complementary fashion by the gain in the writing and thereby is returned to the original level, whereafter the smear component is subtracted from the video signal to provide the video signal whose smear component is eliminated. Therefore, the memory capacity of the 1H memory 8 can be reduced without deteriorating the quality of the reproduced image based on the output from the solid state imager.

Figure 4:
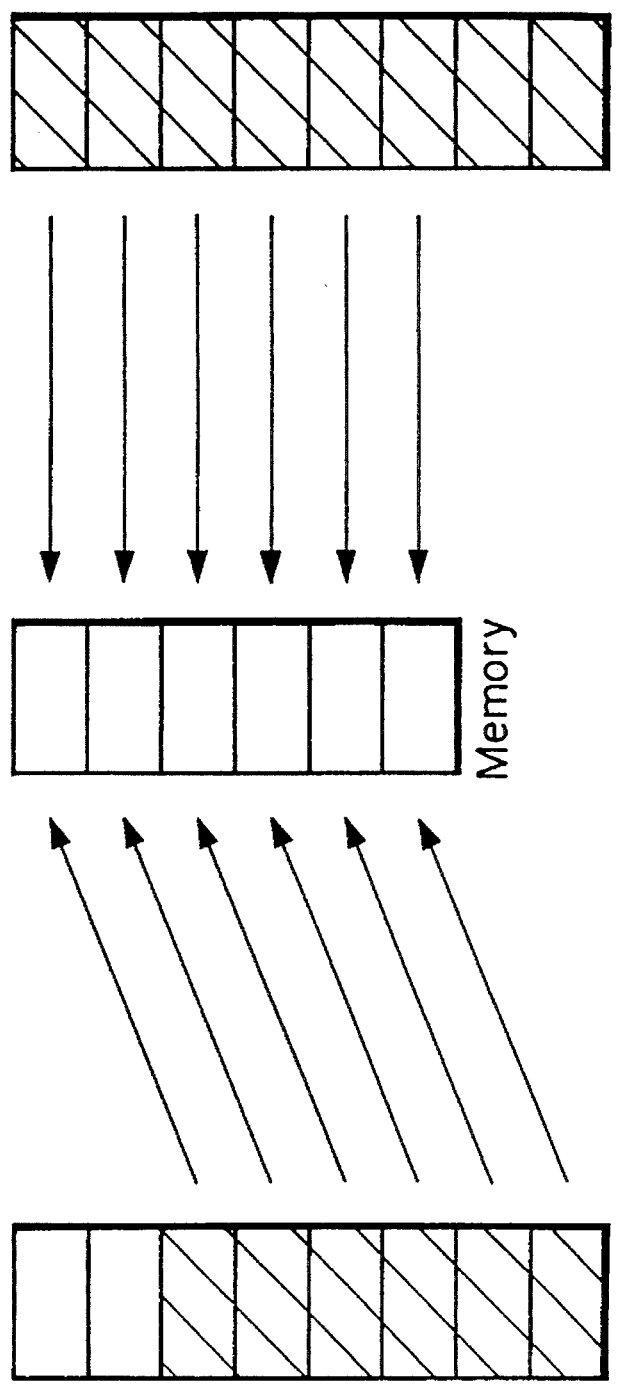
FIG. 4 is a diagram used to explain operation of the smear compensation circuit according to the first embodiment of the present invention.

FIG. 4 of the accompanying drawings is a diagram used to explain operation of the present invention in which a block input is 8 bits and a memory capacity is 6 bits. (a) in FIG. 4 shows the case such that the level of the smear component is small, while (b) in FIG. 4 shows the case such that the level of the smear component is large.

Figure 5:
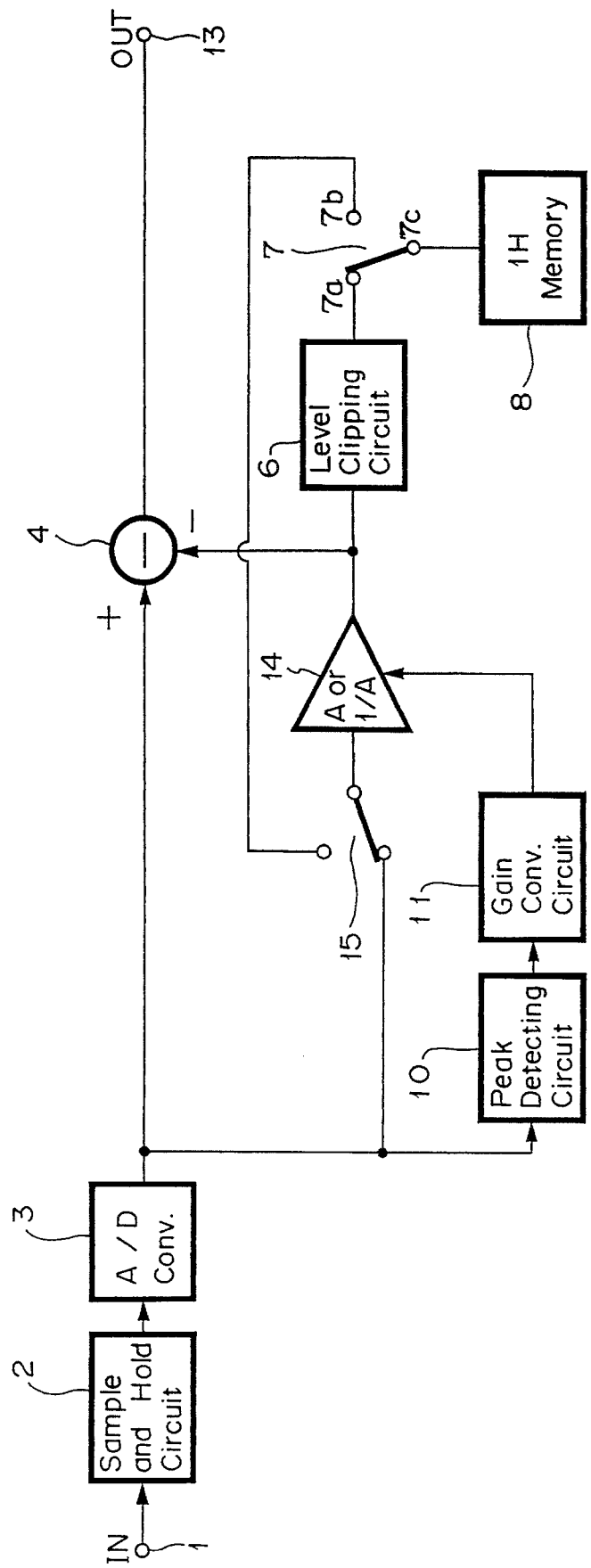
FIG. 5 is a block diagram showing the smear compensation circuit according to a second embodiment of the present invention.

FIG. 5 of the accompanying drawings shows a block diagram of a second embodiment of the smear compensation circuit according to the present invention. In FIG. 5, like parts corresponding to those of FIG. 2 are marked with the same references and therefore need not be described in detail.

According to the second embodiment of the present invention shown in FIG. 5, a gain adjusting circuit 14 operates to adjust the gains of the smear components both when the smear component is written in and read out from the 1H memory. Also, a change-over switch 15 is adapted to switch the writing and reading in the 1H memory 8. Further, the gain converting circuit 11 operates to switch the gain of the gain adjusting circuit 14 such that the gain of the gain adjusting circuit 14 become A when the smear data is written in the 1H memory 8 and 1/A when the smear data is read out from the 1H memory 8.

In the first and second embodiments of the present invention described so far, the gain adjusting circuits 5, 9 and 14 might be generally formed of a multiplier. However, the multiplier is generally large in circuit scale and becomes complex in circuit configuration. Hence, it is preferable that a ×2$^n$ selector, i.e., a bit shifting circuit is employed in order to simplify the circuit configuration.

As set out above, according to the present invention, the peal value of the digital video signal in the vertical blanking period is detected and the gain of data stored in the memory is adjusted in response to the detected peak value so that the data is stored in the restricted memory capacity. Further, when the data is read out from the memory, the gain is adjusted in a complementary fashion to provide the smear component of the original level and this smear component is subtracted from the video signal. Thus, the memory capacity can be reduced without deteriorating the quality of the reproduced picture based on the output of the solid state imager.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A smear compensation circuit for a solid state imager comprising:
    (a) an analog-to-digital converting means for converting an analog video signal supplied thereto from an output of a solid state imager into a digital video signal;
    (b) peak detecting means coupled to an output of said analog-to-digital converting means for detecting a peak value of said digital video signal in a vertical blanking period;
    (c) first level adjusting means, coupled to output of said analog-to-digital converting means, for adjusting said digital video signal on the basis of an output from said peak detecting means, said level adjusting means including a first multiplier with a gain of A wherein A is less than one;
    (d) memory means for storing therein write data in which the level of said digital video signal is adjusted by first level adjusting means;
    (e) second level adjusting means for adjusting a level of read-out data read out from said memory, and including a second multiplier with a gain of 1/A,
    (f) subtracting means for subtracting from said digital video signal a value in which the level of the read-out data read out from said memory means is level-adjusted by said second level adjusting means during a video period of said digital video signal, and in which said peak detecting means detects a peak value during a 1H period of 3H periods before the end of the vertical blanking period where H is the horizontal scanning period.

2. A smear compensation circuit for a solid state imager comprising:
    (a) an analog-to-digital converting means for converting an analog video signal supplied thereto from an output of a solid state imager into a digital video signal;
    (b) peak detecting means coupled to an output of said analog-to-digital converting means for detecting a peak value of said digital video signal in a vertical blanking period;
    (c) first level adjusting means, coupled to output of said analog-to-digital converting means, for adjusting said digital video signal on the basis of an output from said peak detecting means, said level adjusting means including a first multiplier with a gain of A wherein A is less than one;
    (d) memory means for storing therein write data in which the level of said digital video signal is adjusted by first level adjusting means;
    (e) second level adjusting means for adjusting a level of read-out data read out from sad memory and including a second multiplier with a gain of 1/A;
    (f) subtracting means for subtracting from said digital video signal a value in which the level of the read-out data read out from said memory means is level-adjusted by said second level adjusting means during a video period of said digital video signal.

3. A smear compensation circuit for a solid state imager comprising:
    (a) an analog-to-digital converting means for converting an analog video signal supplied thereto from an output of a solid state imager into a digital video signal;
    (b) peak detecting means coupled to an output of said analog-to-digital converting means for detecting a peak value of said digital video signal in a vertical blanking period;
    (c) first level adjusting means, coupled to output of said analog-to-digital converting means, for adjusting said digital video signal on the basis of an output from said peak detecting means, said level adjusting means including a first multiplier with a gain of A wherein A is less than one;
    (d) memory means for storing therein write data in which the level of said digital video signal is adjusted by first level adjusting means;
    (e) second level adjusting means for adjusting a level of read-out data read out from said memory and including a second multiplier with a gain of 1/A;
    (f) subtracting means for subtracting from said digital video signal a value in which the level of the read-out data read out from said memory means is level-adjusted by said second level adjusting means during a video period of said digital video signal, and in which said first and second level adjusting means are formed of bit-shifter circuits, respectively.

4. A smear compensating circuit for a solid state imager comprising, an analog-to-digital converting means for converting an analog video signal supplied thereto from an output of a solid state imager into a digital video signal,
    peak detecting means coupled to an output of said analog-to-digital converting means for detecting a peak value of said digital video signal in a vertical blanking period,
    a level adjusting means for adjusting an input signal to two levels which are a level A or to a level 1/A and wherein A is less than one which receives an input from said peak detecting means and which has an output connected to the first stationary contact of said first switch,
    memory means connected to a first moveable switch contact of a first switch which is moveable between first and second stationary contacts,
    a second switch with a moveable contact connected to an input to said level adjusting means and moveable between first and second stationary contacts, the first stationary contacts of said first and second switches connected together, the second stationary contact of said first switch connected to the output of level adjusting means, the second stationary contact of said second switch connected to the output of said analog-to-digital converting means, and subtracting means for subtracting from said digital video signal the output of said level adjusting means which receives the output of said memory means when said moveable contacts of said first and second switches engage said first stationary contacts of said first and second switches.

* * * * *